United States Patent Office 2,851,465
Patented Sept. 9, 1958

2,851,465
OZONIZATION OF PHENANTHRENES AND PRODUCTS OBTAINED THEREBY

Philip S. Bailey, Austin, Tex., assignor, by mesne assignments, to Esso Research and Engineering Company, Elizabeth, N. J., a corporation of Delaware No Drawing. Application May 14, 1956
Serial No. 584,461

15 Claims. (Cl. 260—340.3)

This invention relates to a process for the ozonization of phenanthrenes and to the ozonization products obtainable thereby. More particularly, the present invention is directed to an ozonization process for preparing monoperoxy derivatives of phenanthrenes.

An object of the present invention is the provision of a novel process for the ozonization of phenanthrenes.

Another object of the present invention is the provision of a process for the production of monoperoxy derivatives of phenanthrenes.

A further object is the provision of monoperoxy derivatives of phenanthrenes.

These and other objects are attained, in general, by suspending a phenanthrene compound having a preferentially ozonizable 9,10 double bond in a substantially anhydrous $C_1$ to $C_{10}$ aliphatic alcohol and passing an ozone-containing gas through said suspension at a temperature from about —100° to about 30° C.

The starting materials for the present invention are phenanthrene compounds which have a preferentially ozonizable 9,10 double bond. Representative compounds of this nature which may be used alone or in admixture include, for example, phenanthrene itself and substituted phenanthrenes including retene (1 - methyl - 7 - isopropylphenanthrene), 3 - methylphenanthrene, 1 - methylphenanthrene, 2-methylphenanthrene, 4-methylphenanthrene, 1-propylphenanthrene, 2-propylphenanthrene, 1-butylphenanthrene, pinanthrene, (1,7-dimethylphenanthrene), 1-ethyl-2-methylphenanthrene, 1-butyl - 2 - methylphenanthrene, 3-ethyl-5-methylphenanthrene, 3-ethyl-6-methylphenanthrene, 1,2,8-trimethylphenanthrene, 1-ethyl-7-isopropylphenanthrene, 1,2,7 - trimethylphenanthrene, 1,2,6-trimethylphenanthrene, 2-isopropyl-1,7,8-trimethylphenanthrene, 1-phenylphenanthrene, 2-phenylphenanthrene, 2-phenanthrenecarboxylic acid, 3-phenanthrenecarboxylic acid, 2-phenanthrenesulfonic acid, 2-nitrophenanthrene, 3-nitrophenanthrene, 2-acetylphenanthrene, 3-acetylphenanthrene, 1,7-phenanthrenedicarboxylic acid.

With respect to the substituted phenanthrenes it is to be observed that there should not be employed a substituted phenanthrene containing functional groups such as hydroxyl, aldehyde, mercapto, ether, or amino groups which activate one of the other rings of the phenanthrene nucleus or which are themselves reactive with ozone. It may be stated, in general, that the substituted phenanthrenes to be used in accordance with the present invention are substituted phenanthrenes preferentially reactable with ozone at the 9,10 double bond.

A preferred class of starting materials for the present invention are phenanthrenes having the formula:

(I)
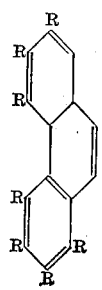

wherein R is selected from the group consisting of hydrogen and alkyl and aryl groups.

In accordance with the present invention a phenanthrene compound of the described nature is suspended in a substantially anhydrous $C_1$ to $C_{10}$ straight chain or branched chain primary or secondary monohydroxyl aliphatic alcohol reactive with ozonolysis intermediates to give the products of the present invention. Representative alcohols of this nature which may be used alone, or in admixture, include alcohols such as methanol, ethanol, propanol, isopropanol, butanol, isobutanol, amyl alcohol, isoamyl alcohol, hexyl alcohol, heptyl alcohol, octanol, nonyl alcohol, decanol, or a mixture thereof. Primary straight chain $C_1$ to $C_4$ aliphatic alcohols are preferred. The alcohol should be substantially completely anhydrous and should preferably, but not necessarily, be substantially pure. It is generally preferable to use from about 0.1 to 1 mol of phenanthrene compound per liter of alcohol although greater amounts up to about 4 mols of phenanthrene compound may be employed, if desired. It is generally preferable to provide as fine a suspension as possible. This may be accomplished through the provision of finely ground phenanthrene compounds. As another example, the phenanthrene compound may be added to an aliphatic alcohol and the resultant mixture brought to reflux temperature in order to dissolve the phenanthrene compound in the alcohol. Thereafter, the solution is allowed to cool whereby a finely divided precipitate of phenanthrene compound is formed. It will be understood that in this situation a solubilizing amount of alcohol will be employed.

An ozone-containing gas is passed through the resultant suspension in order to bring about a reaction involving the ozone, the phenanthrene compound on the alcoholic solvent. The ozone-containing gas should preferably comprise from about 1 to 10 weight percent of ozone in admixture with other gaseous components. Thus, there may be used mixtures of ozone and an oxygen-containing gas such as pure oxygen, air, etc. The ozone-containing gas is passed through the suspension at a suitable rate such as at the rate of about 1 to 500 liters of gas per liter of solution per hour. For best results it is preferable to use from about 10 to about 200 liters of gas per hour. The suspension is preferably agitated while the ozone-containing gas is being passed therethrough. The passage of the gas through the suspension will normally provide sufficient agitation but, in some situations, as, for example, when low gas flow rates are employed, it is desirable to employ positive agitation (e. g., mechanical agitation). Normally, from about 1 to 2 and generally from about 1.1 to about 1.4 mols of ozone per mol of phenanthrene compound are required to bring the reaction to completion and the ozone-containing gas should be passed through the reaction mixture for a period of time sufficient to permit the absorption of such an amount of ozone.

As a result of this treatment there is first formed a reaction mixture containing unreacted alcoholic solvent and an ω-(2'-formyl-2-biaryl)-ω-alkoxymethyl hydroperoxide (hereinafter referred to as a hydroperoxide); such hydroperoxide having the formula:

(II)
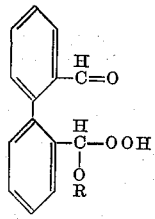

wherein OR represents an alkoxy group derived from the alcoholic solvent.

It will be understood that in the above formula the aryl groups will be unsubstituted, as shown, when the hydroperoxide is derived from phenanthrene but will be substituted when the hydroperoxide is derived from a substituted phenanthrene.

The thus-formed hydroperoxide may be obtained as a product in a manner to be described or may be further reacted with a $C_1$ to $C_4$ aliphatic alcohol to provide a 3,8-dialkoxy-4,5,6,7-diaryl-1,2-dioxacyclooctane (hereinafter referred to as dialkoxy peroxides) having the formula:

(III)

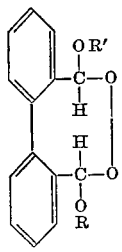

wherein OR has the meaning given above with respect to Formula II and wherein OR' is an alkoxy group containing 1 to 4 carbon atoms.

The aryl groups of Formula III will be unsubstituted, as shown, when the dialkoxy peroxide is derived from phenanthrene and will be substituted when the dialkoxy peroxide is derived from a substituted phenanthrene.

The hydroperoxides of Formula II, supra, are, in general, reactive with $C_1$ to $C_4$ aliphatic alcohols. However, this reaction is dependent on temperature and, in general, will not proceed at temperatures below about 0° C.

When OR of Formula II, supra, is derived from a $C_1$ to $C_4$ aliphatic alcohol, the hydroperoxide will, in general, further react with a $C_1$ to $C_4$ aliphatic alcohol, which may be the same or different, at a temperature of about 0° C. or higher. When OR of Formula II contains more than about 4 carbon atoms, a higher reaction temperature is generally required.

This further reaction of the hydroperoxide should be conducted in the presence of an excess of the $C_1$ to $C_4$ aliphatic alcohol under substantially anhydrous conditions with the hydroperoxide dissolved or suspended in the $C_1$ to $C_4$ aliphatic alcohol (as determined by the relative solubility of the particular hydroperoxide in the $C_1$ to $C_4$ aliphatic alcohol selected for the reaction). If desired, a mixture of two or more $C_1$ to $C_4$ aliphatic alcohols may be employed.

In general, the reaction between the hydroperoxide and the $C_1$ to $C_4$ aliphatic alcohol will not proceed at temperatures below about 0° C. and, when the alkoxy radical of the hydroperoxide (Formula I, supra) contains more than about 4 carbon atoms still higher temperatures are required.

It will be apparent, therefore, that a wide variety of products are obtainable in accordance with the process of the present invention. Thus, a hydroperoxide of Formula II, supra, may be prepared and isolated. This may be accomplished, in general, by conducting the reaction between the phenanthrene compound, ozone, and aliphatic alcohol at a temperature below the temperature of dialkoxy peroxide formation as set forth above. The hydroperoxide formed as a result of this reaction may be recovered at a temperature below the temperature of dialkoxy peroxide formation by any suitable means such as, for example, by evaporation of the excess of aliphatic alcohols. In this situation, some dialkoxy peroxide formation may occur even though the evaporation is conducted below the indicated temperature of dialkoxy peroxide formation so that a mixture of the two types of compounds is obtained. However, if the hydroperoxide is insoluble in the aliphatic alcohol as formed, or is precipitated from the solvent by any suitable means, it may be recovered by filtration, centrifugation, etc., in purified form.

If a dialkoxy peroxide is to be the desired product, a hydroperoxide recovered in the above-described manner may be added to an excess of a $C_1$ to $C_4$ aliphatic alcohol and the resultant reaction mixture may then be brought to the temperature of dialkoxy peroxide formation, which temperature is, as indicated, a temperature of about 0° C., or higher (depending on the length of the alkoxy radical of the hydroperoxide). The dialkoxy hydroperoxide may then be recovered by removal of the excess alcohol in any suitable manner such as by drying, filtering, centrifuging, etc.

As another example, a phenanthrene compound may be suspended in a $C_1$ to $C_4$ aliphatic alcohol and the resultant suspension contacted with ozone in the described manner at the temperature of dialkoxy peroxide formation (e. g., a temperature in the range between about 0° to about 30° C.) in which case the dialkoxy peroxide may be directly prepared.

The present invention will be further illustrated by the following specific examples which are given by way of illustration and are not intended as limitations on the scope of this invention.

*Example 1*

Add about 5.4 grams (0.03 mol) of phenanthrene to about 125 milliliters of substantially pure, substantially anhydrous methanol. Reflux the mixture to dissolve the phenanthrene in the methanol and then cool the solution to a temperature of about −20° C. to precipitate the phenanthrene in finely divided form. Pass a mixture of oxygen and ozone containing about 4 weight percent of ozone through the suspension at a temperature of about −20° C. at a rate of about 17 liters per hour until a clear solution is formed. This normally requires about 2 hours. During this time substantially all of the ozone is absorbed, a total of from about 1.1 to about 1.2 mols of ozone per mol of phenanthrene being absorbed. Warm the resultant solution to room temperature and allow the same to stand for a period of about 12 hours. There is formed a colorless crystalline solid which is recovered by filtration. A yield of about 6.4 grams (about 80%) of a solid melting at 177°–179° C. is obtained which, upon recrystallization from methylethyl ketone has a melting point of 180–181° C. This compound (3,8-dimethoxy-4,5,6,7-dibenzo-1,2-dioxacyclooctane) has the formula:

(IV)

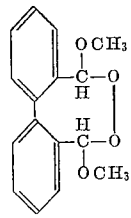

as shown by the following analysis and tests:

*Analysis.*—Calcd. for $C_{16}H_{16}O_4$: C, 70.57; H, 5.92; O, 23.50; methoxyl, 22.80; mol. wt., 272. Found: C, 70.53, 70.73; H, 5.75, 5.99; O, 22.75; methoxyl, 22.81, mol. wt., 260, 296.

The dimethoxy peroxide gives a positive active oxygen test with potassium iodide, showing the presence of a peroxide linkage, but gives a negative hydroperoxide test with lead tetraacetate, showing that the peroxide group is not a hydroperoxide group. The infrared spectrum shows the presence of ether groups and an absence of hydroxyl, carbonyl and hydroperoxy groups. The dimethoxy peroxide is stable to shock but burns quickly in an open flame.

When retene is substituted for phenanthrene and the example is otherwise repeated in the described manner, there is obtained 3,8-dimethoxy-4,5-(3-methylbenzo)-

6,7-(4-isopropylbenzo)-1,2-dioxacyclooctane. This compound has the formula:

(V)
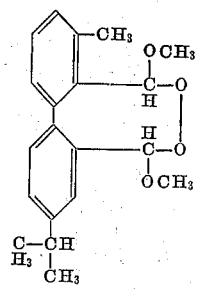

In similar fashion, when 3-methylphenanthrene is substituted for phenanthrene and Example 1 is otherwise repeated, there is obtained 3,8-dimethoxy-4,5-benzo-6,7-(5-methylbenzo)-1,2-dioxacyclooctane having the formula:

(VI)
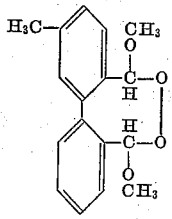

Example 2

Repeat Example 1 but, in this instance, initiate the ozonization reaction at a temperature of about −60° C., and after about 2 hours, warm the reaction mixture to room temperature. The dimethoxy peroxide of Example 1 is again formed with about an 80% yield. At −60° C., the completion of the reaction is indicated by formation of a light blue solution.

Example 3

Repeat Example 1 but, in this instance, do not warm the ozonization solution to room temperature. Instead, slowly add about 200 milliliters of water with agitation in order to obtain a precipitate consisting of colorless crystals. Upon filtration, washing and air drying there is obtained about 5.7 grams (about a 75% yield) of a compound, ω-(2′formyl-2-biphenyl)-ω-methoxymethyl hydroperoxide, melting at 84–88° C. and having the formula:

(VII)
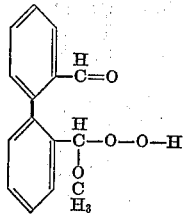

The material is relatively stable at temperatures below 0° C. but tends to decompose at higher temperatures.

The infrared spectrum of the compound taken in a potassium bromide disc shows the presence of hydroxyl groups, carbonyl groups and ether groups. The compound gives a strong active oxygen test with potassium iodide and a positive hydroperoxide test with lead tetraacetate. It is stable to shock but burns readily in an open flame. The analysis is as follows:

*Analysis.*—Calcd. for $C_{15}H_{14}O_4$: C, 69.75; H, 5.46; active O, 6.20; methoxyl, 12.02; mol. wt., 258. Found: C, 70.73; H, 5.22; active O, 5.02; methoxyl 9.26; mol wt., 342.

Example 4

Suspend about 0.5 gram of the hydroperoxide of Example 3 in about 2 milliliters of methanol. At the end of about 1 hour there is obtained about 0.3 gram of the compound of Example 1.

Example 5

Suspend about 1 gram of the hydroperoxide of Example 3 in about 15 milliliters of absolute ethanol and allow the suspension to stand overnight. On filtration and recrystallization with methylethyl ketone there is obtained a compound, 3-ethoxy-8-methoxy-4,5,6,7-dibenzo-1,2-dioxacyclooctane, melting at 156–157° C. and having the following formula:

(VIII)
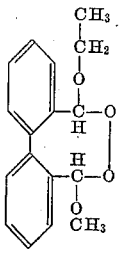

The infrared spectrum of the compound shows the presence of ether groups but an absence of hydroxyl, carbonyl and hydroperoxy groups. The material gives a positive active oxygen test with potassium iodide and a negative hydroperoxide test with lead tetraacetate. The analysis is as follows:

*Analysis.*—Calcd. for $C_{17}H_{18}O_4$: C, 71.31; H, 6.34. Found: C, 71.22; H, 6.63.

The monoperoxy compounds obtained by the process of the present invention are useful for a wide variety of purposes. For example, they may be used in the preparation of 2,2′-biaryldicarboxylic acids such as diphenic acid as disclosed and claimed in copending P. S. Bailey applications S. N. 584,427 and S. N. 584,428, filed of an even date herewith. The monoperoxy compounds may also be used as catalysts for the polymerization of monomeric vinylidene and vinyl compounds, as intermediates for the preparation of plasticizers, etc.

What is claimed is:

1. A process which comprises the steps of suspending a phenanthrene compound having a preferentially ozonizable 9,10 double bond in a substantially anhydrous $C_1$ to $C_{10}$ primary alkyl alcohol and passing an ozone-containing gas through said suspension at a temperature within the range of about −100° to about 30° C. to ozonize said compound and to sever the 9,10 bond of said compound and form a monoperoxy derivative thereof.

2. A process which comprises the steps of suspending in a substantially anhydrous $C_1$ to $C_4$ primary alkyl alcohol a compound having the formula:

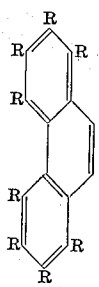

wherein R is selected from the group consisting of hydrogen and alkyl and aryl groups, passing an ozone-containing gas through said suspension at a temperature within the range of about −100° to about 0° C. to interreact said compound, said alcohol and said ozone, warming said solution to a dialkoxy peroxide formation temperature of more than about 0° C. and recovering therefrom a product having the formula:

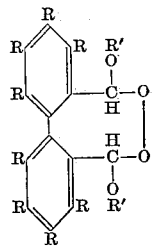

wherein R is selected from the group consisting of hydrogen and alkyl and aryl groups, and wherein R' is a $C_1$ to $C_4$ alkyl group.

3. A process which comprises the steps of suspending in a substantially anhydrous $C_1$ to $C_4$ primary alkyl alcohol a compound having the formula:

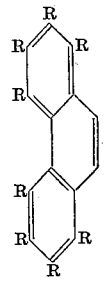

wherein R is selected from the group consisting of hydrogen and alkyl and aryl groups, passing an ozone-containing gas through said suspension at a temperature within the range of about —100° to about 0° C. for a period of time sufficient to interreact said compound, said alcohol and said ozone and recovering a product having the formula:

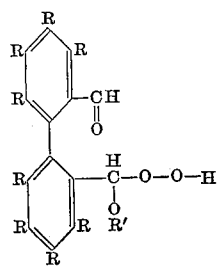

wherein R is selected from the group consisting of hydrogen and alkyl and aryl groups, and wherein R' is a $C_1$ to $C_4$ alkyl group.

4. A process which comprises the steps of preparing an about 0.1 to 1 molar suspension in a substantially anhydrous $C_1$ to $C_4$ primary alkyl alcohol of a compound having the formula:

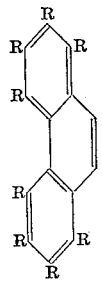

wherein R is selected from the group consisting of hydrogen and alkyl and aryl groups, and passing through said suspension at a temperature of about 0° to about —60° C. a mixture of oxygen and ozone containing about 1 to 10 weight percent of ozone for a period of time sufficient to permit the reaction of from about 1 to 2 mols of ozone per mol of said compound.

5. A process as in claim 4 wherein the solution is warmed to a temperature of more than about 0° C. whereby there is formed a compound having the formula:

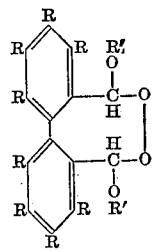

wherein R is selected from the group consisting of hydrogen and alkyl and aryl groups; and wherein R' is selected from the group consisting of $C_1$ to $C_4$ alkyl groups.

6. A process which comprises the steps of adding to an excess of a $C_1$ to $C_4$ monohydroxy primary alkyl alcohol a compound having the formula:

(II)

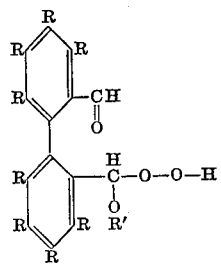

wherein R is selected from the group consisting of hydrogen and alkyl and aryl radicals and wherein R' is selected from the group consisting of $C_1$ to $C_{10}$ alkyl radicals, and maintaining the resultant mixture at a temperature within the range of about 0° to about 30° C. for a period of time sufficient to react the said compound with the said alcohol to form a reaction product having the formula:

(III)

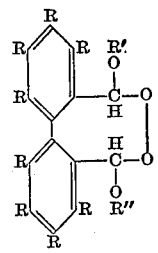

wherein R is selected from the group consisting of hydrogen and alkyl and aryl groups, wherein R' is selected from the class consisting of $C_1$ to $C_{10}$ alkyl groups, and wherein R'' is selected from the class consisting of $C_1$ to $C_4$ alkyl groups.

7. A process for preparing 3-ethoxy-8-methoxy-4,5,6,7-dibenzo-1,2-dioxacyclooctane which comprises the steps of reacting ω-(2'-formyl-2-biphenyl)-methoxymethyl hydroperoxide with ethanol in the presence of an excess of ethanol.

8. A process which comprises the steps of preparing about an 0.1 to 1 molar suspension of phenanthrene in substantially anhydrous methanol, cooling said suspension to a temperature of about 0° to —60° C., and passing a mixture of oxygen and ozone containing about 0.1 to 10 weight percent of ozone through said suspension for a period of time sufficient to form a substantially clear solution.

9. A process as in claim 7 wherein the solution is warmed to a temperature of more than about 0° C. whereby there is formed a compound having the formula:

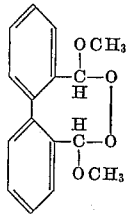

10. A process as in claim 7 wherein at least about an equal volume of water is added to said solution at a temperature of less than about 0° C. with agitation to form a precipitate of a compound having the formula:

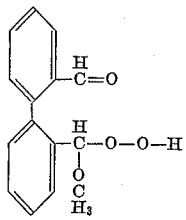

11. A compound having the formula:

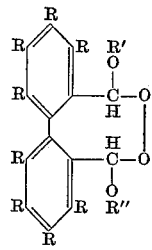

wherein R is selected from the group consisting of hydrogen, and alkyl and aryl groups, wherein R' is selected from the class consisting of $C_1$ to $C_4$ alkyl groups, and wherein R'' is selected from the class consisting of $C_1$ to $C_{10}$ alkyl groups.

12. A compound having the formula:

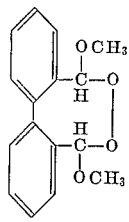

13. A compound having the formula:

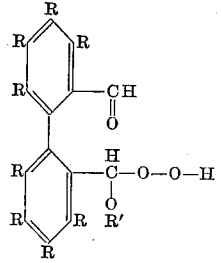

wherein R is selected from the group consisting of hydrogen, and alkyl and aryl groups; and wherein R' is selected from the group consisting of $C_1$ to $C_{10}$ alkyl radicals.

14. A compound having the formula:

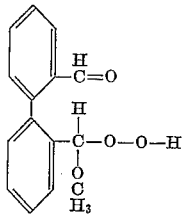

15. A compound having the formula:

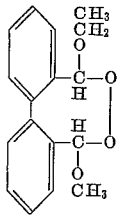

No references cited.